(12) United States Patent
Reinke et al.

(10) Patent No.: US 7,480,948 B2
(45) Date of Patent: Jan. 27, 2009

(54) PATIENT SUPPORT APPARATUS HAVING A BRAKE/STEER MECHANISM WITH A FOOT PEDAL GEAR REDUCER

(75) Inventors: Christian H. Reinke, York, SC (US); Jonathan D. Turner, Dillsboro, IN (US); Richard H. Heimbrock, Cincinnati, OH (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 11/837,726

(22) Filed: Aug. 13, 2007

(65) Prior Publication Data
US 2007/0271700 A1 Nov. 29, 2007

Related U.S. Application Data

(63) Continuation of application No. 11/342,449, filed on Jan. 30, 2006, and a continuation of application No. 10/349,428, filed on Jan. 22, 2003, now Pat. No. 7,302,717.

(51) Int. Cl.
*A61G 7/00* (2006.01)
(52) U.S. Cl. .................................. 5/86.1; 5/610; 5/601
(58) Field of Classification Search ............. 5/600–601, 5/610–611, 86.1; 188/1.12
See application file for complete search history.

(56) References Cited

U.S. PATENT DOCUMENTS

| | | |
|---|---|---|
| 2,096,229 A | 10/1937 | Dudley |
| 2,572,548 A | 10/1951 | Weisz et al. |
| 3,304,116 A | 2/1967 | Stryker |
| 3,493,085 A | 2/1970 | Libhart |
| 3,635,491 A | 1/1972 | Drews et al. |
| 4,175,783 A | 11/1979 | Pioth |
| 4,276,962 A | 7/1981 | Aulik |
| 4,309,791 A | 1/1982 | Aulik |
| 4,439,879 A | 4/1984 | Werner |
| 4,922,574 A | 5/1990 | Heiligenthal et al. |
| 5,279,010 A | 1/1994 | Ferrand et al. |
| 5,348,326 A | 9/1994 | Fullenkamp et al. |
| 5,377,372 A | 1/1995 | Rudolf et al. |
| 5,450,639 A | 9/1995 | Weismiller et al. |
| 5,497,856 A | 3/1996 | Block et al. |
| 5,806,111 A | 9/1998 | Heimbrock et al. |
| 5,987,671 A | 11/1999 | Heimbrock et al. |

(Continued)

FOREIGN PATENT DOCUMENTS

EP 1243241 9/2002

(Continued)

OTHER PUBLICATIONS

Hill-Rom (A Hillenbrand Industry), User Manual for AvantGuard Electric Bed, QD1771, 4 pgs.

(Continued)

*Primary Examiner*—Fredrick Conley
(74) *Attorney, Agent, or Firm*—Barnes & Thornburg LLP

(57) ABSTRACT

A patient support apparatus includes a brake mechanism and a steer mechanism operated by a foot pedal. A gear reducer is coupled to the foot pedal. The gear reducer reduces the amount that the foot pedal is depressed to operate the brake mechanism and steer mechanism.

18 Claims, 6 Drawing Sheets

U.S. PATENT DOCUMENTS

| | | |
|---|---|---|
| 5,996,149 A | 12/1999 | Heimbrock et al. |
| 6,000,076 A | 12/1999 | Webster et al. |
| 6,076,208 A | 6/2000 | Heimbrock et al. |
| 6,240,579 B1 | 6/2001 | Hanson et al. |
| 6,264,006 B1 * | 7/2001 | Hanson et al. ............ 188/1.12 |
| 6,282,738 B1 | 9/2001 | Heimbrock et al. |
| 6,286,165 B1 | 9/2001 | Heimbrock et al. |
| 6,314,597 B2 | 11/2001 | Heimbrock et al. |
| 6,315,319 B1 | 11/2001 | Hanson et al. |
| 6,321,878 B1 | 11/2001 | Mobley et al. |
| 6,330,926 B1 | 12/2001 | Heimbrock et al. |
| 6,421,854 B1 | 7/2002 | Heimbrock |
| 6,446,283 B1 | 9/2002 | Heimbrock et al. |
| 6,453,508 B1 | 9/2002 | Denner |
| 6,460,205 B1 | 10/2002 | Lewandowski et al. |
| 6,473,921 B2 | 11/2002 | Brooke et al. |
| 6,505,359 B2 | 1/2003 | Heimbrock et al. |
| 6,598,247 B1 | 7/2003 | Heimbrock et al. |
| 6,691,346 B2 | 2/2004 | Osborne et al. |
| 6,820,294 B2 | 11/2004 | Shiery et al. |
| 6,865,775 B2 | 3/2005 | Ganance |
| 6,902,019 B2 | 6/2005 | Heimbrock et al. |
| 6,978,500 B2 | 12/2005 | Osborne et al. |
| 7,302,717 B2 | 12/2007 | Reinke et al. |
| 2004/0139545 A1 | 7/2004 | Reinke et al. |

FOREIGN PATENT DOCUMENTS

| | | |
|---|---|---|
| FR | 2836375 | 8/2003 |
| WO | 03/072373 | 9/2003 |

OTHER PUBLICATIONS

Hill-Rom (A Hillenbrand Industry), Quick Reference Guide for AvantGuard Electric Bed LI158Ax, LI159Ax, 2 pgs.

* cited by examiner

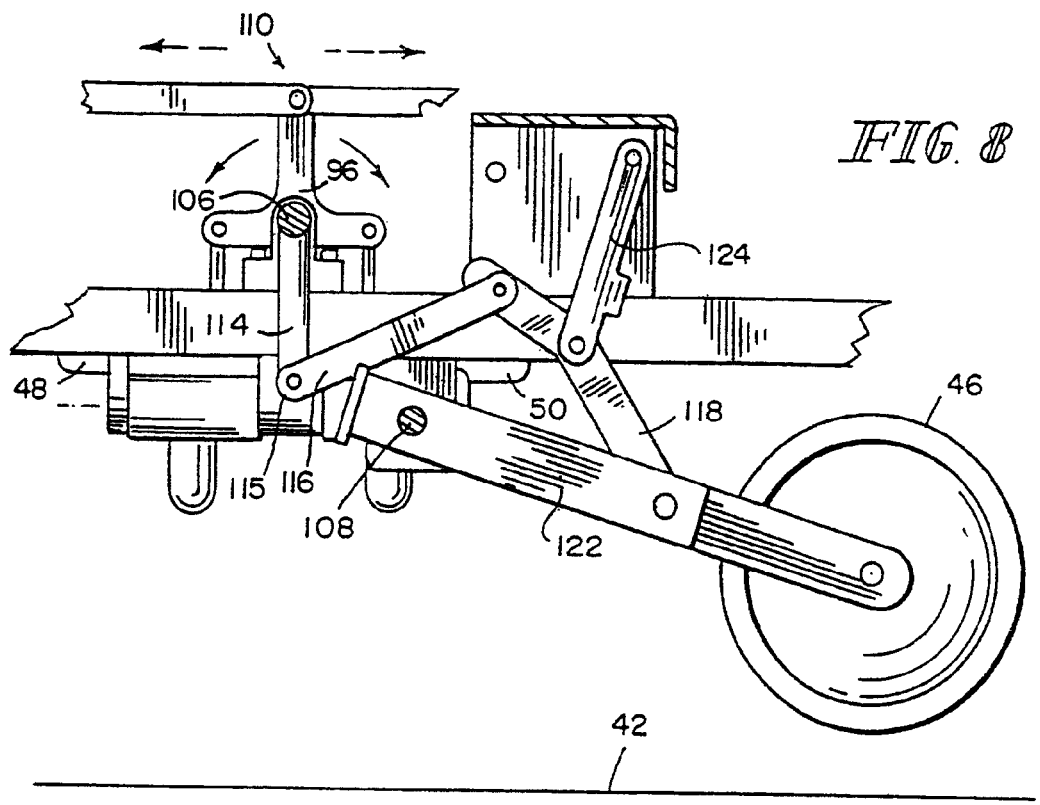
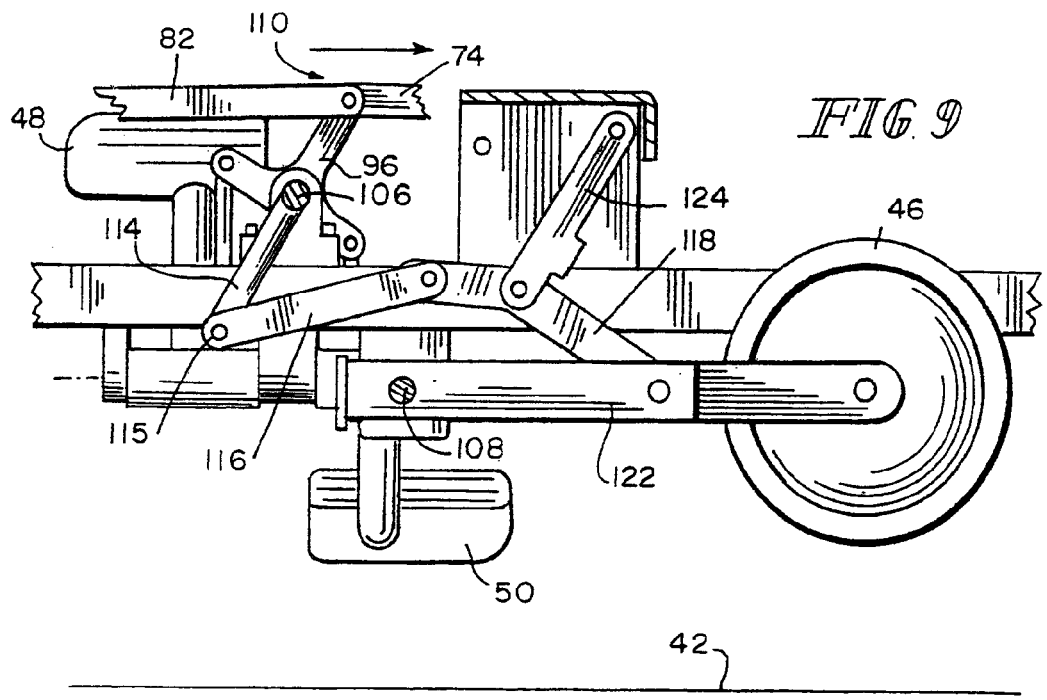

PATIENT SUPPORT APPARATUS HAVING A BRAKE/STEER MECHANISM WITH A FOOT PEDAL GEAR REDUCER

This application is a continuation of U.S. application Ser. No. 11/342,449, filed Jan. 30, 2006, which is a continuation of U.S. application Ser. No. 10/349,428, filed Jan. 22, 2003, and each of which is hereby incorporated by reference herein.

BACKGROUND

The present invention relates to a stretcher such as a wheeled stretcher for use in a hospital, and particularly to a brake and steering control system for such a stretcher. More particularly, the present invention relates to a hospital stretcher having a deployable center wheel to aid in steering the stretcher, and foot pedals configured to operate the center wheel and a brake mechanism.

SUMMARY

Hospital care givers use hospital stretchers for transporting patients and for positioning patients in examination, operation, or other hospital rooms. The present disclosure will be described primarily as a hospital stretcher, but it will be understood that the same may be used in conjunction with any other patient support apparatus, such as a hospital bed.

The present invention comprises one or more of the following features or characteristics or combinations thereof.

A patient support apparatus such as a stretcher or mobile hospital bed is provided for transporting a patient throughout a hospital or other such facility. Such supports typically have a frame with opposite sides, opposite ends, and four corners. Typically, a caster is coupled to each of the four corners. Each caster typically has a caster wheel. To make steering of the patient support easier, a steering wheel is provided centrally located relative to the frame. This steering wheel is carried by a wheel support assembly coupled to the frame and configured to support the steering wheel for movement between a raised position and a lowered position in which the steering wheel engages a floor. For safety reasons, a brake is coupled to at least one of the four casters to engage its caster wheel.

A brake actuator is provided for use by the caregiver in setting the brake. The brake actuator is movable relative to the frame between a braking position wherein the brake is caused to engage a wheel on a caster and a non-braking position wherein the brake is disengaged from the caster wheel. This brake actuator may be coupled to two of the corners of the frame, and illustratively to two of the end corners of the frame to extend across either the head end of the frame or the foot end of the frame. This brake actuator will illustratively have a dimension substantially equal to the width of the frame. In some cases, a gear drive may be coupled between the brake actuator and the brake with the gear drive configured to multiply the movement of the brake when the brake actuator is actuated.

Thus, a brake actuator or brake actuating means coupled to one of the longitudinal ends of the frame is provided. Illustratively, the actuating means may be coupled to the frame such that the length of the actuating means is disposed substantially orthogonal to the frame longitudinal axis.

This actuating means may further control the movement of the steering wheel between its raised and lowered positions as well as the actuation of the brake. In such an embodiment, the brake actuator or brake actuating means illustratively operates the steering wheel via a link that moves along a line substantially parallel to the longitudinal axis of the stretcher.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 8 is a side view similar to that of FIG. 7, showing the fifth wheel being lifted from the floor;

FIG. 9 is a side view similar to that of FIGS. 7 and 8, showing the fifth wheel in its raised position.

DETAILED DESCRIPTION OF THE DRAWINGS

Figure 1:
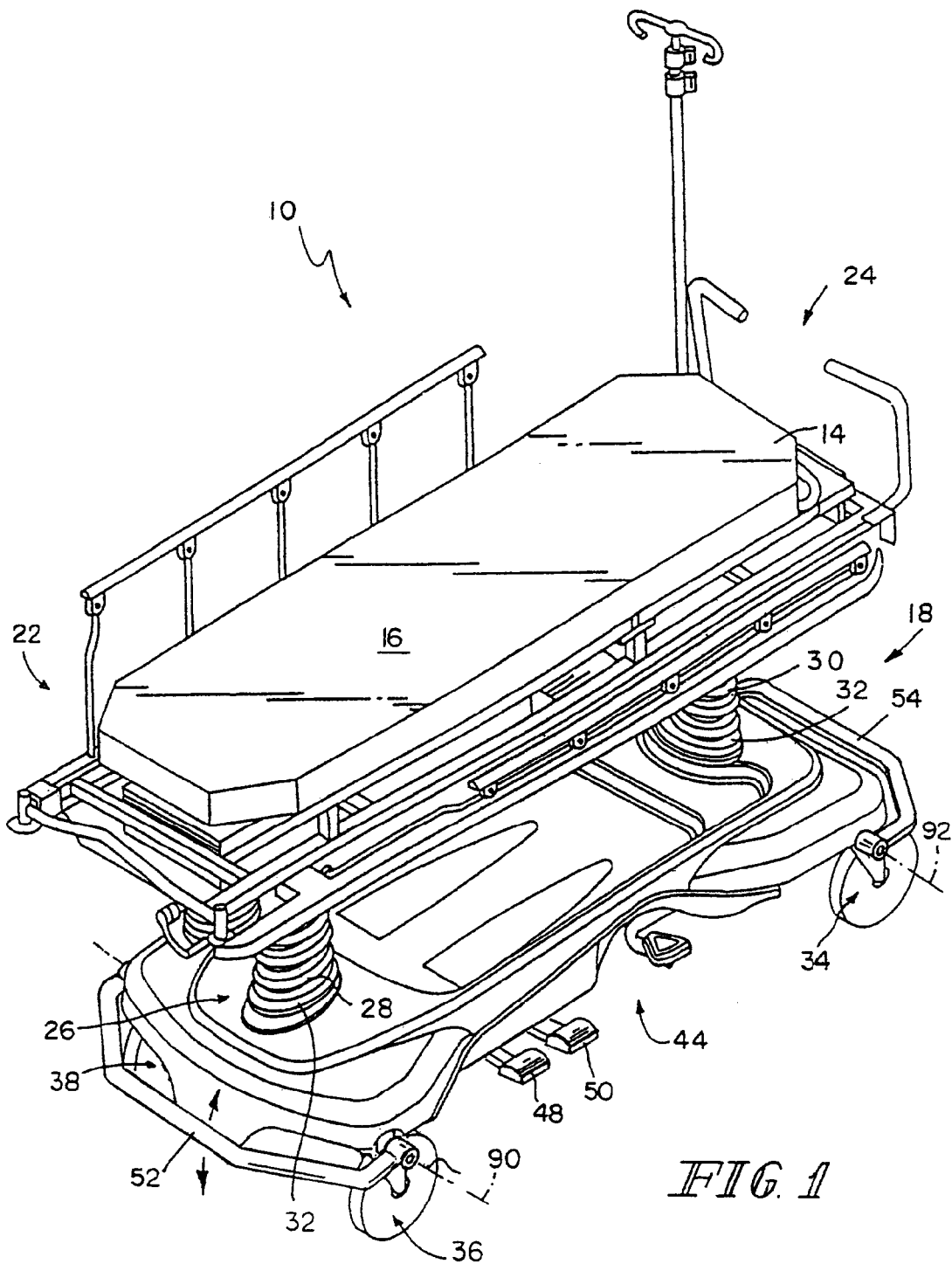
FIG. 1 is a perspective view of a stretcher having an upper frame and a lower frame covered by a shroud.

A hospital stretcher 10 is shown in FIG. 1 as having an upper frame 12 for supporting a mattress 14 having an upwardly facing patient support surface 16. Stretcher 10 also includes a lower frame 18 coupled to the upper frame 12, lower frame 18 being substantially covered by a shroud 20. Stretcher 10 includes a head end 24 and a foot end 22. As used in this description, the phrase "head end 24" will be used to denote any referred-to object that is positioned to lie nearest the head end 24 of stretcher 10, and the phrase "foot end 22" will be used to denote the end of any referred-to object that is positioned to lie nearest the foot end 22 of the stretcher 10.

Illustratively, upper frame 12 is movably supported above lower frame 18 by a lifting mechanism 26, shown in FIG. 1. Lifting mechanism 26 illustratively includes a head end hydraulic cylinder 30 and a foot end hydraulic cylinder 28, both of which are covered by flexible rubber boots 32.

Casters 34, 36, 38 and 40 are mounted to lower frame 18, one at each corner, so that stretcher 10 can be rolled over a floor 42 across which a patient is being transported. Several foot pedals 44 are pivotally coupled to lower frame 18 and are coupled to the lifting mechanism 26 to control the vertical movement of head end 24 and foot end 22 of the upper frame 12 relative to the lower frame 18. Lower frame 18 has four corners. Stretchers of this type are shown in U.S. Pat. Nos. 5,348,326, 5,806,111, 5,987,671, 5,996,149, 6,000,076, 6,076,208, 6,282,738, 6,330,926 and 6,446,283 and are incorporated herein by reference to establish the general nature of stretchers, lift mechanisms and the like. It will be appreciated, however, that the invention disclosed and claimed herein may be utilized on a patient support having structures other than illustrated herein.

Figure 2:
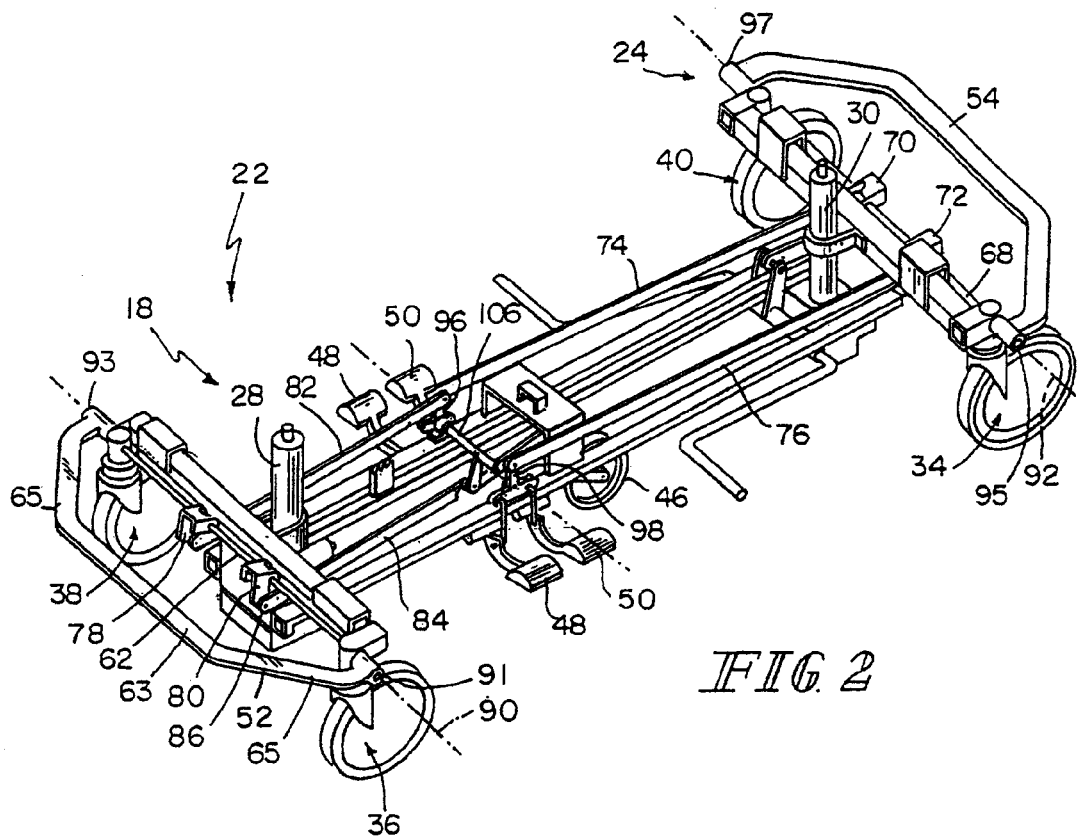
FIG. 2 is a perspective view of a stretcher having the upper frame and shroud removed allowing the lower frame to be more easily viewed.
Figure 3:
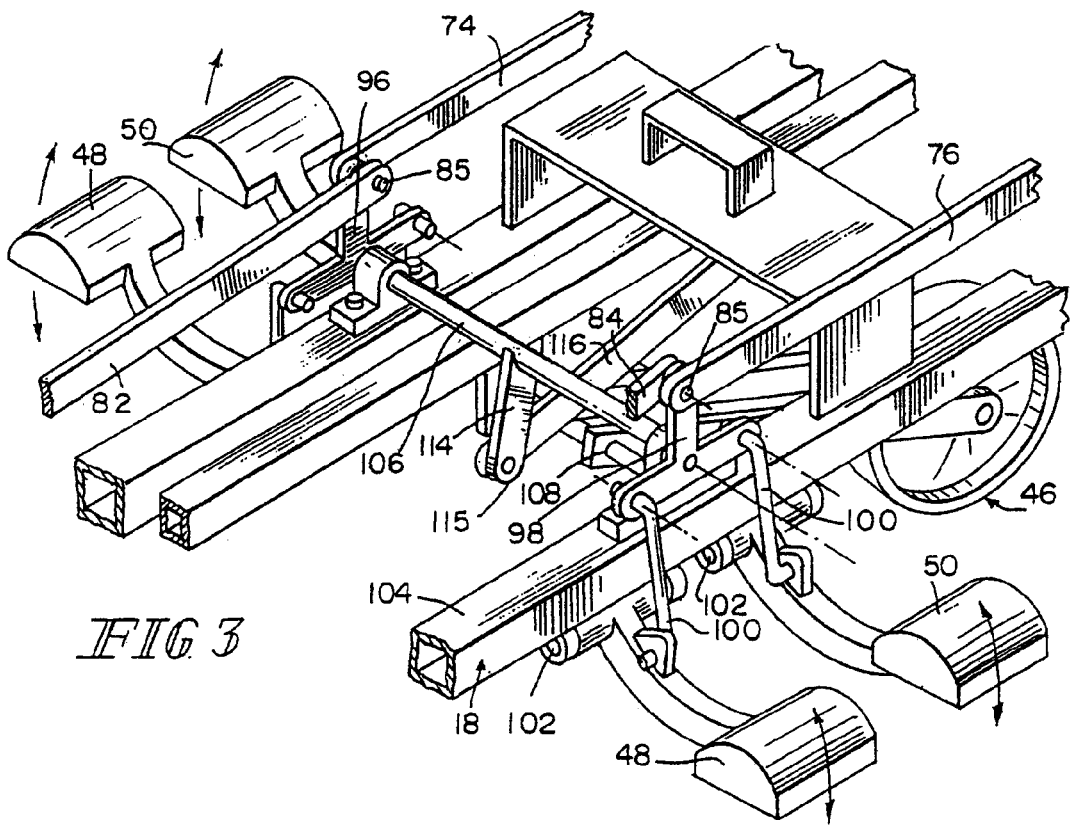
FIG. 3 is an enlarged view of a central portion of the lower frame, showing the operation of and linkage between the side actuator pedals and the fifth wheel.
Figure 4:
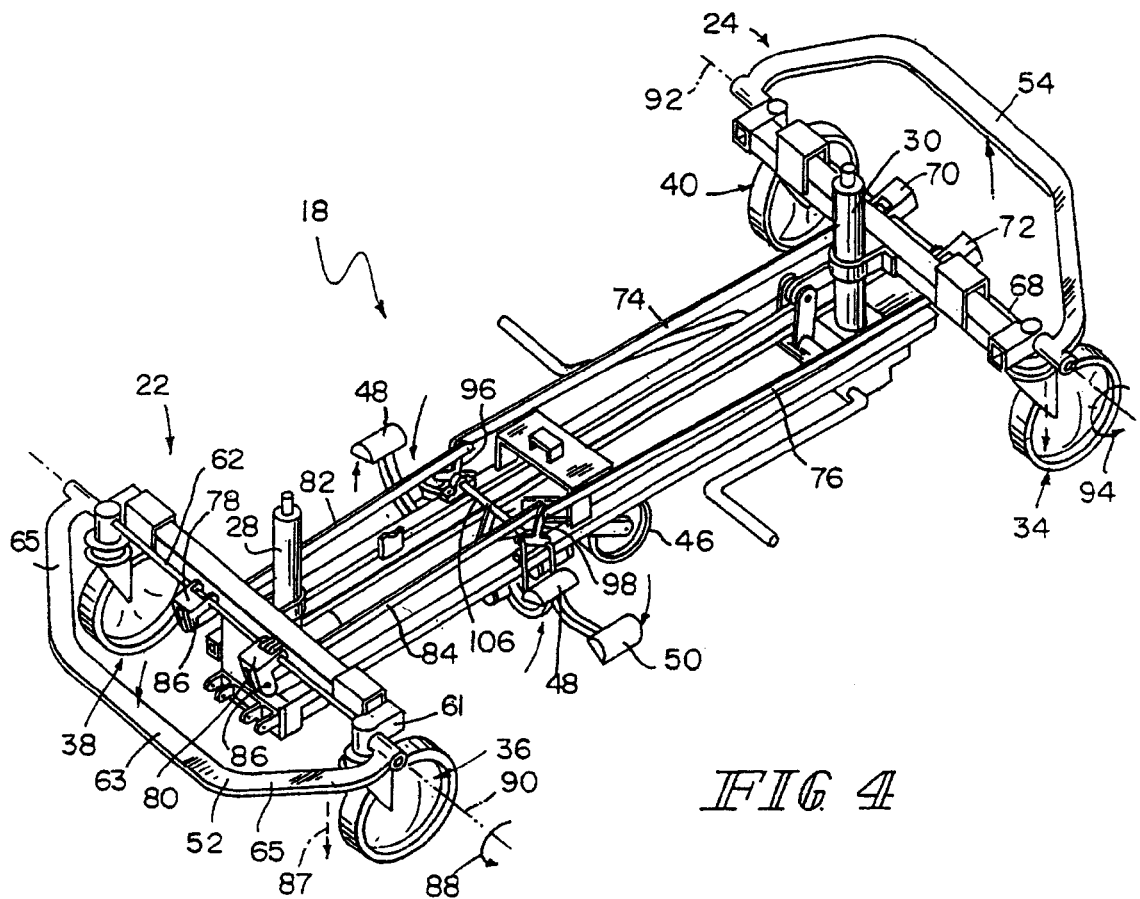
FIG. 4 is a view similar to that of FIG. 2, showing a brake-actuating bar being depressed at the foot end of the stretcher and showing one side actuator pedal on each side of the stretcher in the lowered position.
Figure 6:
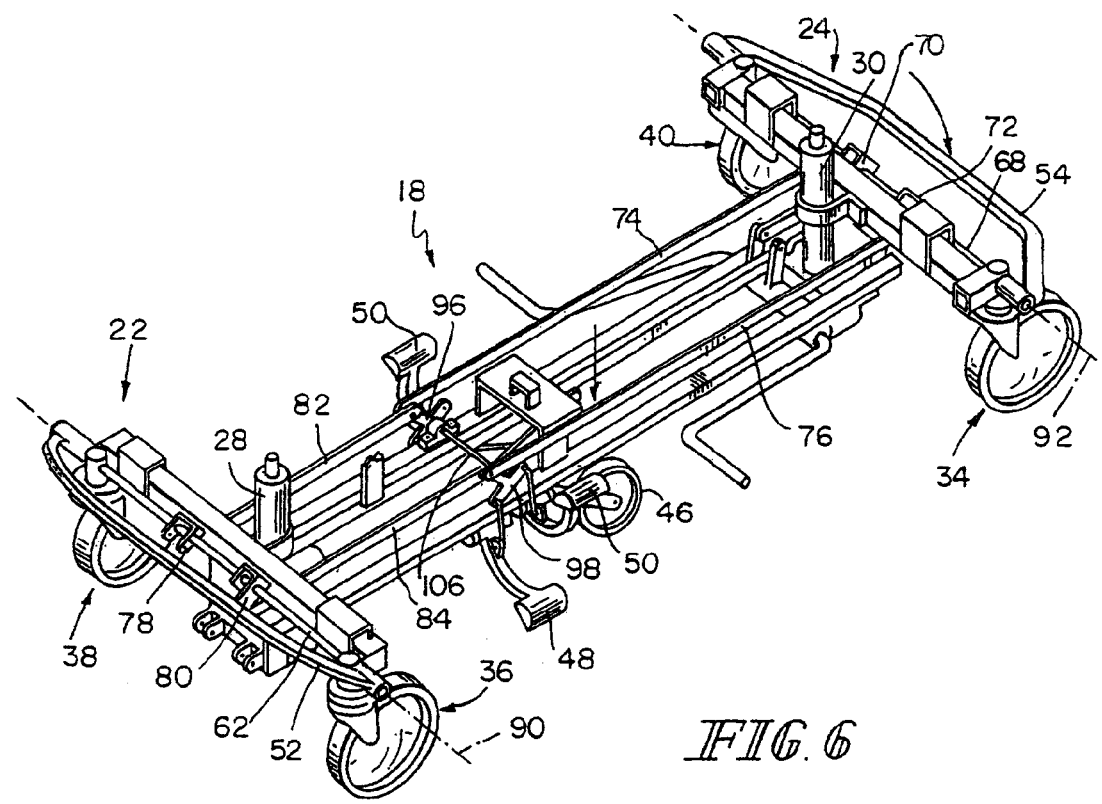
FIG. 6 is a view similar to that of FIGS. 2 and 4, showing the wheel-actuating bar being depressed at the head end of the stretcher and showing the other side actuator pedal on each side of the stretcher in the lowered position.
Figure 7:
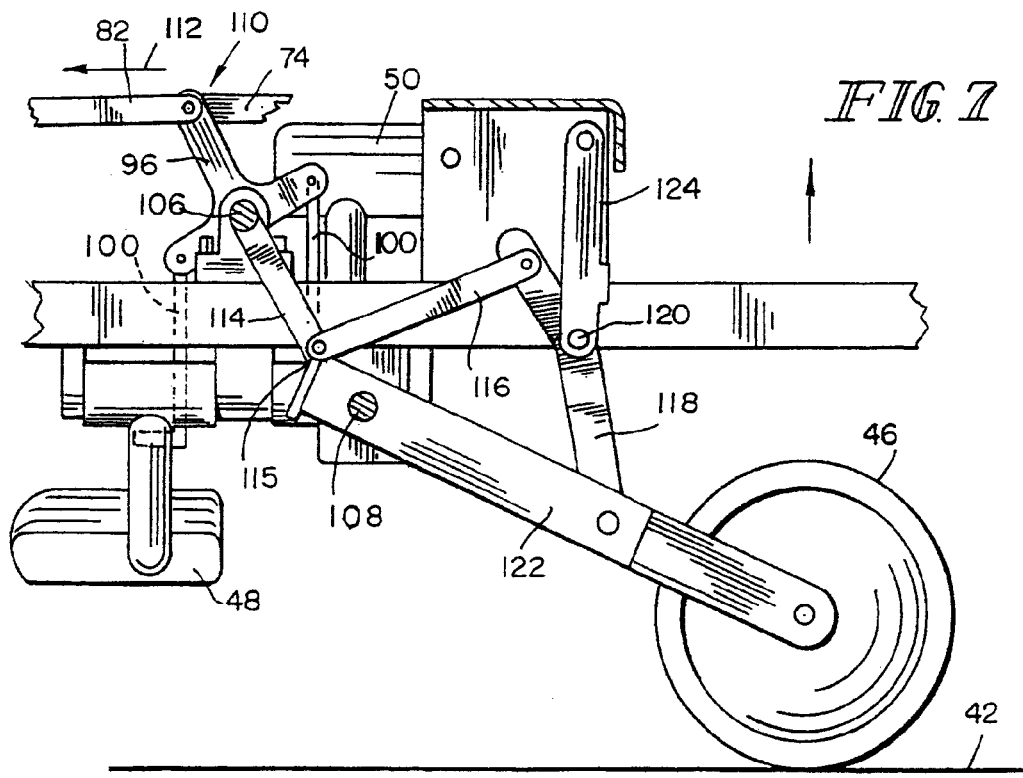
FIG. 7 is a side view of a central portion of the lower frame, showing the fifth wheel in its lowered position, engaging the floor.

FIG. 2 shows lower frame 18 exposed without upper frame 12 or shroud 20, so that the moving parts herein described can be better viewed. Lower frame 18 illustratively has two longitudinal ends, the head end 24 and the foot end 22. As shown in FIGS. 2-4 and 6-9, the illustrative embodiment includes a fifth wheel 46, which may also be referred to as a steering wheel. Fifth wheel 46 is movable between a raised position, shown in FIG. 9, and a lowered position, shown in FIG. 7. Fifth wheel 46 engages floor 42 when in its lowered position, as can be seen in FIG. 7. The floor-engaging fifth wheel 46 facilitates steering of stretcher 10 when the fifth wheel 46 is in the lowered position, as shown in FIG. 4. However, when it is desired to move stretcher 10 in a sideways direction, fifth wheel 46 is desirably moved into the raised position, shown in FIG. 9, so that casters 34, 36, 38 and 40 can pivot about their axes and allow stretcher 10 to move sideways.

The illustrative fifth wheel 46 is actuated between the raised position and the lowered position by side actuator pedals 48, 50 and by a brake actuator or brake-actuating bar 52 and wheel-actuating bar 54. Brake-actuating bar 52 is coupled to two corners at the longitudinal foot end 22 of stretcher 10, and wheel-actuating bar 54 is coupled to two corners at the longitudinal head end 24 of stretcher 10. Illustratively, side actuator pedals 48 cause fifth wheel 46 to engage floor 42 when actuator pedals 48 are moved downwardly by a care giver, as shown in FIGS. 6 and 7. In the neutral position, wherein the side actuator pedals 48 and 50 are in alignment, as shown in FIGS. 2 and 3, fifth wheel 46 is positioned in the raised position, wherein fifth wheel 46 is not engaging floor 42, as can be seen in FIG. 9. The intermediate position, as fifth wheel 46 is moved between the raised position and the lowered position, or vice versa, can be seen in FIG. 8.

Illustratively, side actuator pedals 48 and 50 are linked to each other such that downward movement of one of the actuator pedals 48 causes actuator pedals 50 to move upward, as can be seen in FIG. 6. Also, downward movement of one side actuator pedal 48 causes the other side actuator pedal 48 to move downward as well. Pedals 50 are linked in an identical manner such that pedals 50 move either upward or downward together. Such coordinated linkage between the side actuator pedals 48, 50 is described in more detail herein below.

Side actuator pedals 48, 50 are also linked to brake-actuating bar 52 and wheel-actuating bar 54. Illustratively, as side actuator pedals 48 are moved downwardly, wheel-actuating bar 54 is caused to move downwardly. Likewise, if wheel-actuating bar 54 is moved downwardly by a care taker, side actuator pedals 48 will move downwardly via a manner described in more detail below.

In the same manner, when side actuator pedals 50 are moved downwardly, brake-actuating bar 52 moves downwardly, and side actuator pedals 48 and wheel-actuating bar 54 move upwardly. In the neutral position shown in FIGS. 2 and 5, brake-actuating bar 52 and wheel-actuating bar 54 extend outwardly from lower frame 18 substantially parallel to floor 42.

Figure 5:
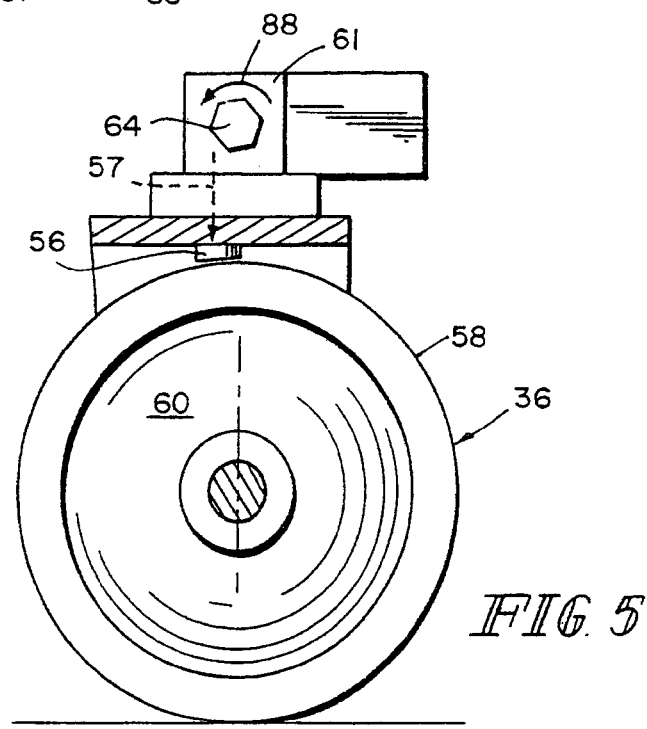
FIG. 5 is a side view of a caster wheel, showing the actuation of the brake resulting from pivoting of a shaft passing through the caster.

When brake-actuating bar 52 or side actuator pedals 50 are urged downwardly by a care taker into a position shown in FIG. 4, a brake or brake mechanism 56 in at least one of the casters 34, 36, 38, 40 is caused to actuate, as can be seen in FIG. 5. Illustratively, brake-actuating bar 52 includes a step portion 63 disposed between two connecting portions 65, as can be seen in FIGS. 2 and 4. Connecting portions 65 connect brake-actuating bar 52 to an outside edge of each corner of lower frame 18. Wheel-actuating bar 54 is constructed in a similar fashion.

Illustratively, brake mechanism 56 comprises a pin configured to move in the direction indicated by arrow 57 toward the rubberized periphery 58 of the caster wheel 60. Caster 36 is illustratively shown in FIG. 5, however, it should be understood that other casters 34, 38, and 40 can be similarly constructed.

When wheel-actuating bar 54 is urged downwardly from the position shown in FIG. 4 to the position shown in FIGS. 2-3 (the neutral position), side actuator pedals 48 are urged into the neutral position, and brake mechanism 56 is then released from its engagement with the caster wheel periphery 58.

Illustratively, brake mechanism 56 functions in the following manner. Caster wheels 34, 36, 38 40 are commercially available as model number 2446sxp200r36-32, and manufactured by Tente Casters, Inc., 2266 South Park Drive, Heborn, Ky. 41048. Such a caster illustratively includes brake mechanism 56 as part of the unit. Such a caster also includes a wheel 60 having a rubberized periphery 58. As can be seen in FIG. 5, when actuated, brake mechanism 56 moves downwardly inside caster frame 61 to engage rubberized periphery 58 of wheel 60, thereby causing wheel 60 to be held in place.

Brake mechanism 56 is operated in the following manner. As brake-actuating bar 52 or side actuator pedals 50 are urged downwardly by a care giver, brake-actuating bar 52 pivots about shaft 62, causing a hex portion 64 of shaft 62 (visible in FIG. 5) to move brake mechanism 56 downwardly in a direction indicated by arrow 57. Shaft 62 is illustratively a hex rod, although other configurations are within the scope of the disclosure. Such actuation of brake mechanism 56 is illustratively synchronized between all four casters 34, 36, 38, 40, although it is contemplated that less than four casters can be engaged by a brake mechanism 56, and still result in stretcher 10 being locked in place.

When wheel-actuating bar 54 is depressed by a care giver, brake mechanisms 56 are released from their braking position, and as wheel-actuating bar 54 is further depressed, fifth wheel 46 is moved into engagement with floor 42, as shown in FIGS. 6-7. Such movement of fifth wheel 46 is illustratively described below. Wheel-actuating bar 54 is fixedly connected to shaft 68, and brake-actuating bar 52 is fixedly connected to shaft 62. Shaft 62 and shaft 68 are journaled for rotation about their respective axes 90, 92. Illustratively, ends of shaft 62 are supported by foot end 22 corners of lower frame 18 and tips 91, 93 of shaft 62 extend beyond the perimeter of the corners such that brake-actuating bar 52 attaches adjacent shaft tips 91, 93. Similarly, ends of shaft 68 are supported by head end 24 corners of lower frame 18 and tips 95, 97 of shaft 68 extend beyond the perimeter of the corners such that wheel actuating bar 54 attaches adjacent shaft tips 95, 97.

Movement of wheel-actuating bar 54 causes shaft 68 to rotate about its axis 92, just as actuation of brake-actuating bar 52 causes shaft 62 to rotate about its axis 90. Shaft 68 is fixedly coupled to shoulders 70, 72, which are in turn pivotably coupled to ends of arms 74, 76, respectively. Likewise, shaft 62 is fixedly coupled to shoulders 78, 80, which are pivotably coupled to ends of arms 82, 84, respectively. Shoulders 70, 72, 78, 80 are illustratively L-shaped and formed of metal, although other constructions are within the scope of the disclosure.

Shoulders 70, 72, 78 and 80 are pivotably coupled to the respective arms 74, 76, 82, 84 via pins 86, as can be seen in FIG. 4. Arm 74 is also coupled to arm 82, and arm 76 is coupled to arm 84 via pins 85 near the central portion of lower frame 18, as can be seen in the enlarged view shown in FIG. 3. Such a construction provides for shaft 62 to move in conjunction with shaft 68, and likewise brake-actuating bar 52 to move in conjunction with wheel-actuating bar 54 and side actuator pedals 48, 50.

Illustratively, when brake-actuating bar 52 is moved downwardly in direction 87, as shown in FIG. 4, shaft 62 pivots counterclockwise in the direction shown by arrow 88 about axis 90 (see also FIG. 5). The rotation about axis 90 causes shoulders 78, 80 to also rotate about axis 90, thereby moving connected arms 82, 84 toward head end 24. Because arms 82, 84 are linked to arms 74, 76, the longitudinal movement from arms 82, 84 results in movement of shoulders 70, 72 at head end 24. Shoulders 70, 72 are caused to pivot counterclockwise about axis 92 in the direction indicated by arrow 94, as can be seen in FIG. 4. This movement results in shaft 68 also rotating in direction 94 about axis 92.

Movement of side actuator pedals 48, 50 is coordinated with movement of brake-actuating bar 52 and wheel-actuating bar 54 in the following manner. At the point where arms 82 and 74 meet, a T-shaped bell crank 96 connects arms 74, 82 to pedals 48, 50. Likewise, at the point where arms 84 and 76 meet, a second T-shaped bell crank 98 connects the arms 76, 84 to pedals 48, 50, as can be seen in FIGS. 3 and 7-9.

As can be viewed in FIG. 3, each pedal 48, 50 is connected to bell crank 98 via a link 100. Links 100 illustratively use a ball and stud type of interface with bell cranks 96, 98. Pedals 48, 50 pivot about pins 102 having a longitudinal axis, which are mounted under side frame member 104 of lower frame 18. As one of pedals 48 is urged downwardly by a care giver to the position shown in FIGS. 6-7, bell cranks 96, 98 are caused to pivot counterclockwise (as viewed from FIG. 7) about shaft 106 by forces delivered through links 100. Pivoting movement causes fifth wheel 46 to move downwardly toward floor 42, such movement being described in more detail herein.

Bell cranks 96, 98 are fixedly connected to each other via shaft 106 such that pivoting movement of one bell crank 96 or 98 causes the other to pivot about the axis of shaft 106 in the same direction. However, it should be understood that pivoting movement of one bell crank 96, 98 is also transferred to the other bell crank via arms 74, 76, 82, 84, shoulders 70, 72, 78, 80, and shafts 62, 68.

Illustratively, when pedal 48 moves downwardly with the pivoting of bell crank 96 about shaft 106, pedal 50 moves upwardly to the position shown in FIG. 7. Similarly, and simultaneously, the other pedal 48 moves downwardly, bell crank 98 pivots about the axis of the shaft 106, and the other pedal 50 moves upwardly, as can be seen in FIG. 6. Because of the linkage of bell cranks 96, 98 to shafts 62, 68, brake-actuating bar 52 is also caused to move upwardly and wheel-actuating bar 54 is caused to move downwardly, as can be seen in FIG. 6.

In a similar fashion, when pedal 50 is urged downwardly (or, in the alternative, brake-actuating bar 52 is urged downwardly), bell cranks 96, 98 cause pedals 48 to move upwardly to the position shown in FIG. 4. Such movement causes fifth wheel 46 to move to its raised position, shown in FIG. 9. Also, if pedal 50 or brake-actuating bar 52 is moved beyond its neutral position (shown in FIGS. 2-3), to the brake-actuating position (shown in FIGS. 4-5), brake mechanism 56 is caused to move toward engagement of rubberized periphery 58 of wheel 60, as is described above.

Fifth wheel 46 is moved between its lowered and raised positions in the following manner. Illustratively, as can be seen in FIGS. 7-9, fifth wheel 46 pivots about the axis of shaft 108 (visible in perspective in FIG. 3), which is mounted to lower frame 18 of the stretcher 10. In the lowered position, shown in FIG. 7, upper portion 110 of bell crank 96 has been moved in the counterclockwise direction indicated by arrow 112. Simultaneously with the movement of upper portion 110, radially extending arm 114, which extends from a central portion of shaft 106 in a direction radially opposite that of upper portion 110 of bell crank 96, moves counterclockwise such that its distal end 115 moves toward head end 24 of stretcher 10. Such movement causes link 116 to also move toward head end 24, and thereby cause pivot arm 118 to pivot about pin 120. Illustratively, link 116 is rigid and pivots relative to arm 114 at one end, and pivots relative to pivot arm 118 at the other end. Pivot arm 118 is pivotably coupled to link 116 at one end, and pivotably coupled to wheel arm 122 at the other end. Illustratively, pivot arm 118 is angled and pivots about pin 120 at the angle.

Swing arm 124 supports pin 120 and pivot arm 118 pivots about the axis defined by pin 120. Swing arm 124 pivots between a substantially vertical position, shown in FIG. 7, and an angled position, shown in FIG. 9. When arm 114 moves, the combination of link 116, swing arm 124, and pivot arm 118 causes the substantially longitudinal movement of distal end 115 of arm 114 to be converted to substantially downward movement by pivot arm 118, thereby causing wheel arm 122 to pivot about shaft 108 and move fifth wheel 46 into engagement with floor 42.

In order to disengage fifth wheel 46 from floor 42, a care giver must depress either one of side actuator pedals 50 or brake-actuating bar 52. As either a side actuator pedal 50 or the brake-actuating bar 52 is urged downwardly, radially extending arm 114 pivots clockwise (as viewed from FIG. 7) with shaft 106, thereby moving link 116 in a substantially longitudinal direction toward foot end 22. Link 116 causes pivot arm 118 to pivot about pin 120, and thereby urge wheel arm 122 away from floor 42 to the intermediate position shown in FIG. 8. In the intermediate position, fifth wheel 46 is illustratively spaced approximately ½ inch from floor 42.

As brake-actuating bar 52 or side actuator pedal 50 is further depressed by a care giver to its lowered position shown in FIG. 4, radially extending arm 114 continues to pivot clockwise about shaft 106 to a position shown in FIG. 9. In such a position, brake mechanism 56 engages the rubberized periphery 58 of a wheel 60, as described above, and fifth wheel 46 is retained in its raised position. In the raised position, fifth wheel 46 is illustratively spaced approximately two inches from floor 42.

The positioning of pedals 48, 50 on the sides of stretcher 10 permits a care giver to operate both the brake mechanism(s) 56 and the fifth wheel 46 of the stretcher 10 while being located on the side of the patient. Also, by positioning wheel-actuating bar 54 at the head end 24 of the stretcher 10, a care giver pushing stretcher 10 from the head end (which is common in medical practices because the care giver is then adjacent the patient's head) can easily engage the fifth wheel 46, and thereby more easily steer the stretcher 10 while pushing the patient.

When the patient has reached the destination, a care giver will typically position the patient such that the head end 24 of the stretcher is aligned with a wall of the hospital room, and then apply the brake mechanism 56 to maintain the stretcher 10 in that position. The application of the brake mechanism 56 is facilitated by positioning brake-actuating bar 52 at the foot end 22 of the stretcher 10.

Figure 10:
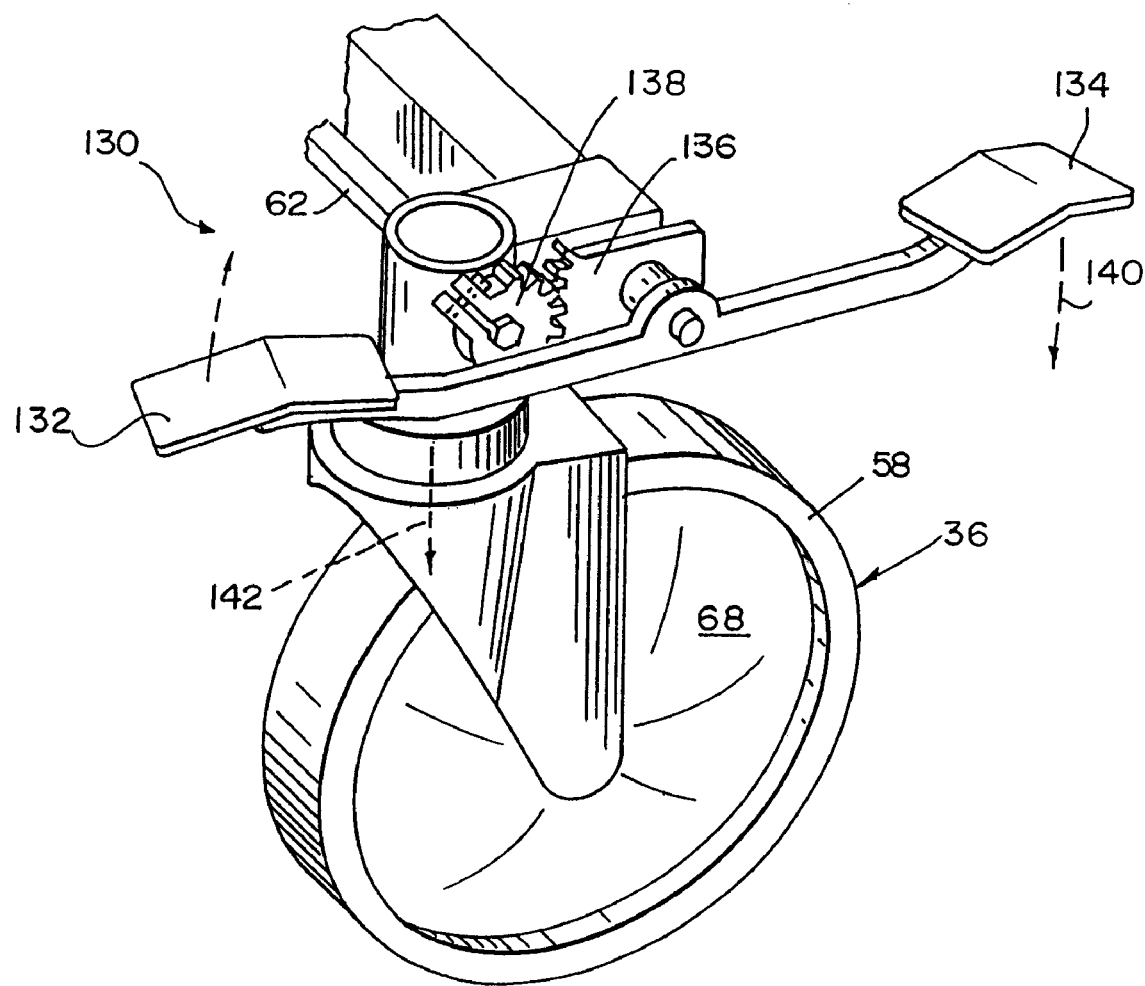
FIG. 10 is a perspective view of another embodiment of the disclosure, showing a lever coupled to the caster and showing a gear drive joining the lever to the caster.

It is within the scope of the disclosure to substitute levers for brake-actuating bar 52 and wheel-actuating bar 54 as suggested in FIG. 10. For example, a lever assembly 130 having a foot pad 132, 134 at each end can be used to operate brake mechanism 56 and fifth wheel 46, as disclosed above. Lever assembly 130 is also illustratively connected to shaft 62 via gears 136, 138. Gears 136, 138 are illustratively configured to reduce the necessary movement of lever assembly 130 by a half (i.e. a 2:1 gear ratio). Therefore, by depressing foot pad (brake actuator) 134 in the direction shown by arrow 140, brake mechanism (not shown) will move twice as fast in the direction indicated by arrow 142 toward engagement with rubberized periphery 58. Lever assemblies 130 are illustratively positioned at each corner of lower frame 18, however, other configurations are within the scope of the disclosure. For example, lever assemblies 130 could be placed at opposite corners.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

There is a plurality of advantages of the present invention arising from the various features of the stretcher brake/steer mechanism described herein. It will be noted that alternative embodiments of the stretcher brake/steer mechanism of the present invention may not include all of the features described yet still benefit from at least some of the advantages of such features. Those of ordinary skill in the art may readily devise their own implementations of a stretcher brake/steer mechanism that incorporate one or more of the features of the present invention and fall within the spirit and scope of the present invention as defined by the appended claims.

The invention claimed is:

1. A patient support apparatus comprising
a frame,
a plurality of casters coupled to the frame, at least one of the plurality of casters having a brake,
a shaft that is rotatable to move the brake to brake and unbrake the respective caster,
a rotatable lever, and
a gear reducer coupled to the lever and coupled to the shaft, wherein the frame has a plurality of corners, each caster of the plurality of casters being coupled to a respective corner of the plurality of corners, and the gear reducer is coupled to one of the corners of the plurality of corners of the frame.

2. The patient support apparatus of claim 1, wherein the shaft rotates about a first axis and the lever rotates about a second axis that is generally parallel with the first axis and spaced therefrom.

3. The patient support apparatus of claim 2, wherein the gear reducer is configured so that rotation of the lever through a first angle results in rotation of the shaft through a second angle that is greater than the first angle.

4. The patient support apparatus of claim 2, further comprising a steering wheel operably coupled to the shaft, rotation of the shaft resulting in raising and lowering of the steering wheel.

5. The patient support apparatus of claim 2, further comprising a foot pad coupled to the lever.

6. The patient support apparatus of claim 2, wherein the gear reducer comprises a first gear that rotates with the shaft about the first axis and a second gear that rotates with the lever about the second axis.

7. The patient support apparatus of claim 2, wherein the lever is generally perpendicular to the second axis and extends in opposite directions from the second axis.

8. A patient support apparatus comprising
a frame,
a plurality of casters coupled to the frame, at least one of the plurality of casters having a brake,
a shaft that is rotatable to move the brake to brake and unbrake the respective caster,
a rotatable lever, and
a gear reducer coupled to the lever and coupled to the shaft, wherein the shaft rotates about a first axis and the lever rotates about a second axis that is generally parallel with the first axis, the lever is generally perpendicular to the second axis and extends in opposite directions from the second axis, and a first foot pad is coupled to one end of the lever and a second foot pad is coupled to an opposite end of the lever.

9. A patient support apparatus comprising
a frame,
a plurality of casters coupled to the frame,
a wheel coupled to the frame and movable between a raised position and a lowered position,
a shaft that is rotatable to move the wheel between the raised and lowered positions,
a rotatable lever, and
a gear reducer coupled to the lever and coupled to the shaft.

10. The patient support apparatus of claim 9, wherein the frame has a plurality of corners, each caster of the plurality of casters being coupled to a respective corner of the plurality of corners, and the gear reducer is coupled to one of the corners of the plurality of corners of the frame.

11. The patient support apparatus of claim 9, further comprising a foot pad coupled to the lever.

12. The patient support apparatus of claim 9, wherein the gear reducer is configured so that rotation of the lever through a first angle results in rotation of the shaft through a second angle that is greater than the first angle.

13. The patient support apparatus of claim 9, wherein rotation of the shaft results in braking and unbraking of at least one of the casters.

14. The patient support apparatus of claim 9, wherein the shaft rotates about a first axis and the lever rotates about a second axis that is generally parallel with the first axis.

15. The patient support apparatus of claim 14, wherein the gear reducer comprises a first gear that rotates with the shaft about the first axis and a second gear that rotates with the lever about the second axis.

16. The patient support apparatus of claim 14, wherein the lever is generally perpendicular to the second axis and extends in opposite directions from the second axis.

17. The patient support apparatus of claim 16, wherein a first foot pad is coupled to one end of the lever and a second foot pad is coupled to an opposite end of the lever.

18. The patient support apparatus of claim 14, wherein the second axis is spaced from the first axis.

* * * * *